(12) United States Patent
Fujita

(10) Patent No.: US 8,705,178 B2
(45) Date of Patent: Apr. 22, 2014

(54) MICROSCOPE OBJECTIVE LENS

(71) Applicant: Olympus Corporation, Tokyo (JP)

(72) Inventor: Yuso Fujita, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/771,967

(22) Filed: Feb. 20, 2013

(65) Prior Publication Data

US 2013/0222920 A1      Aug. 29, 2013

(30) Foreign Application Priority Data

Feb. 28, 2012 (JP) ................................. 2012-040973

(51) Int. Cl.
*G02B 21/02* (2006.01)
(52) U.S. Cl.
USPC .......................................... 359/656; 359/660
(58) Field of Classification Search
USPC .................................................. 359/656–661
See application file for complete search history.

(56) References Cited

U.S. PATENT DOCUMENTS

2003/0043473 A1 *   3/2003   Okuyama ..................... 359/659

FOREIGN PATENT DOCUMENTS

JP          05-119264 A       5/1993
JP          07-261093 A      10/1995

* cited by examiner

*Primary Examiner* — Scott J Sugarman
(74) *Attorney, Agent, or Firm* — Holtz, Holtz, Goodman & Chick, PC

(57) ABSTRACT

A microscope objective lens includes, in an order starting from an object side, a first lens group having a positive power, a second lens group having a positive power, a third lens group having a negative power, and a fourth lens group having a positive power. The second lens group is configured to move in an optical axis direction between the first lens group and the third lens group so as to correct a variation in an aberration caused by a thickness of a cover glass. The following conditions are satisfied:

0.65<NA<1; and

1<$f1/F$<2, where

NA is a numerical aperture of the microscope objective lens, F is a focal length of the microscope objective lens, and f1 is a focal length of the first lens group.

4 Claims, 5 Drawing Sheets

MICROSCOPE OBJECTIVE LENS

CROSS-REFERENCE TO RELATED APPLICATIONS

This application is based upon and claims the benefit of priority from prior Japanese Patent Application No. 2012-040973, filed Feb. 28, 2012, the entire contents of which are incorporated herein by this reference.

BACKGROUND OF THE INVENTION

1. Field of the Invention

The present invention relates to a microscope objective lens.

2. Description of the Related Art

In the field of microscopes, there has conventionally been a demand for the ability to observe cultured cells at high resolution. In order to meet this demand, a microscope objective lens having a high numerical aperture and a relatively low magnification is needed. A microscope objective lens that can meet this demand is disclosed by, for example, Japanese Laid-open Patent Publication No. 5-119264.

The objective lens disclosed by Japanese Laid-open Patent Publication No. 5-119264 has a high numerical aperture of 0.7 while having 20× magnification. Further, this lens realizes a high flatness of the field.

For observation of cultured cells, a cover glass, a dish, and the like (these items are referred to as a group as cover glass hereinafter) are usually used, and the thickness of the cover glass varies depending upon the specification, the production errors, etc. The variation in thickness of a cover glass causes variations in spherical aberrations in the field, leading to deteriorations in the observation performance. Accordingly, a microscope objective lens having a correction collar, for correcting variations in spherical aberrations caused by variations in thickness of a cover glass, is desired.

SUMMARY OF THE INVENTION

One of aspects of the present invention is a microscope objective lens, including, in an order starting from an object side, a first lens group having a positive power, a second lens group having a positive power, a third lens group having a negative power, and a fourth lens group having a positive power, in which the second lens group is configured to move in an optical axis direction between the first lens group and the third lens group so as to correct a variation in an aberration caused by a thickness of a cover glass, and the microscope objective lens satisfies conditional expressions of:

$0.65<NA<1$; and $1<f1/F<2$, where:

NA is a numerical aperture of the microscope objective lens, F is a focal length of the microscope objective lens, and f1 is a focal length of the first lens group.

BRIEF DESCRIPTION OF THE DRAWINGS

The present invention will be more apparent from the following detailed description when the accompanying drawings are referenced.

DESCRIPTION OF THE EMBODIMENTS

First, explanations will be given for a configuration common to microscope objective lenses according to the respective embodiments of the present invention by referring to FIG. 1.

Figure 1:
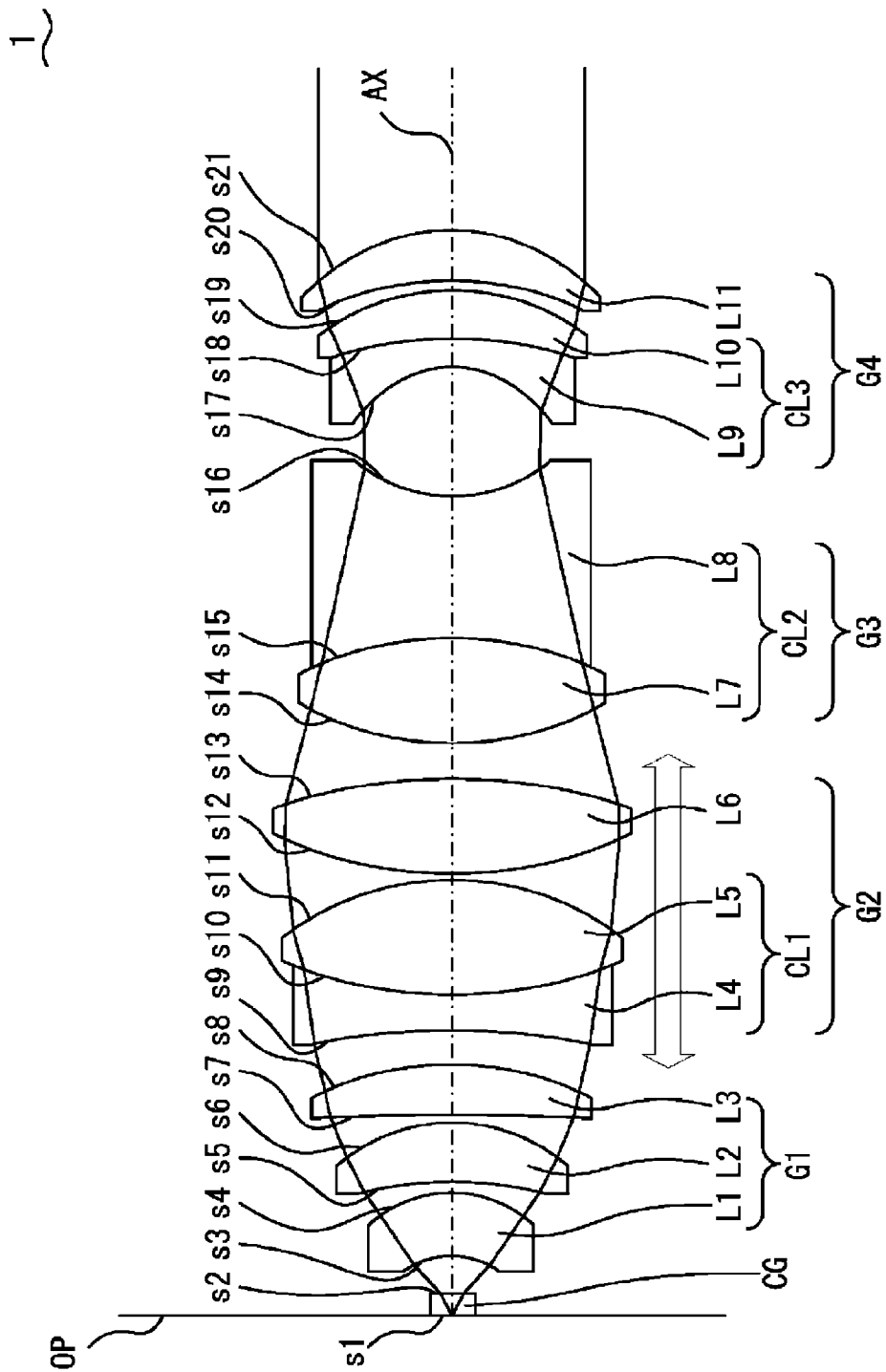
FIG. 1 is a sectional view of a microscope objective lens according to a first embodiment of the present invention.

A microscope objective lens 1 exemplified in FIG. 1 is a dry objective lens having a correction collar, and includes a first lens group G1 having a positive power, a second lens group G2 having a positive power, a third lens group G3 having a negative power, and a fourth lens group G4 having a positive power, in order starting from the object side. Second lens group G2 moves in optical axis AX directions between first lens group G1 and third lens group G3 so as to correct variations in aberrations caused by the thickness of a cover glass CG. In other words, second lens group G2 realizes a so-called correction collar function in the microscope objective lens 1.

The microscope objective lens 1 is further configured to satisfy the conditional expressions below, where NA and F are the numerical aperture and the focal length of the microscope objective lens 1, respectively, and f1 is the focal length of first lens group G1.

$$0.65<NA<1 \quad (1)$$

$$1<f1/F<2 \quad (2)$$

Conditional expression (1) defines the numerical aperture of the microscope objective lens 1. When conditional expression (1) is satisfied, a high numerical aperture is realized, making it possible to observe a sample such as cultured cells at a high resolution.

With a numerical aperture lower than the lower limit value of conditional expression (1), a high resolution cannot be realized. By contrast, the microscope objective lens 1 will not have a numerical aperture higher than the upper limit value of conditional expression (1) because it is a dry objective lens.

Conditional expression (2) defines the ratio of the focal length of first lens group G1 to that of the microscope objective lens 1. When conditional expression (2) is satisfied, an excellent correction of spherical aberrations is realized in first lens group G1.

A ratio lower than the lower limit value of conditional expression (2) makes the positive power too intense in first lens group G1, leading to greater spherical aberrations in first lens group G1. Also, the beam height is lowered in the lens groups subsequent to first lens group G1, making it difficult to correct the field curvature, so that the flatness of the field cannot be maintained. This makes it impossible to realize a wide field of view on the object side. By contrast, a ratio higher than the upper limit value of conditional expression (2) makes the positive power too weak in first lens group G1, so that the beam cannot be curved sufficiently. This makes it impossible to take in a sufficient amount of light from the object plane, preventing a high object-side numerical aperture.

In the microscope objective lens 1 configured as above, first lens group G1 mainly has a relatively intense positive power so as to secure a high numerical aperture, second lens group G2 mainly has a function of correcting spherical aberrations, and third and fourth lens groups G3 and G4 mainly have a function of suppressing the Petzval sum to correct the field curvature. Also, the microscope objective lens 1 can correct spherical aberrations excellently by the movement of second lens group G2 in directions of optical axis AX even when variations in the thickness of cover glass CG have caused a variation in the spherical aberrations. Thus, the microscope objective lens 1 can correct aberrations excellently while having a high numerical aperture and low magnification.

Next, explanations will be given for more preferable configurations of a microscope objective lens according to each embodiment of the present invention.

First lens group G1 includes three single lenses, and at least two of them on the object side are desirably meniscus lenses each having its concave surface on the object side. It is also desirable that second lens group G2 include a cemented lens having a negative lens and a positive lens, and include a biconvex lens, in order from the object. It is also desirable that third lens group G3 include a cemented lens having a positive lens and a negative lens and that the cemented lens have the meniscus form having its convex surface on the object side. It is desirable that fourth lens group G4 have a cemented lens located closest to the object.

Further, it is also desirable that the microscope objective lenses according to the respective embodiments of the present invention satisfy the following conditional expressions. In the expressions, f2 is the focal length of second lens group G2, f3 is the focal length of third lens group G3, f2CE is the focal length of the cemented lens included in second lens group G2, and Δd is the maximum movement distance of second lens group G2 in the directions of optical axis AX.

$$1 < f2/F < 3 \quad (3)$$

$$1 < |f3/F| < 2.4 \quad (4)$$

$$5 < |f2CE/F| < 15 \quad (5)$$

$$0.1 < \Delta d/F < 0.3 \quad (6)$$

Conditional expression (3) defines the ratio of the focal length of second lens group G2 to that of the microscope objective lens 1. When conditional expression (3) is satisfied, excellent correction of spherical aberration is realized in second lens group G2.

A ratio of focal lengths lower than the lower limit value of conditional expression (3) makes the positive power too intense in second lens group G2, lowering the beam height in second lens group G2 and subsequent lens groups. This makes it difficult to correct field curvature, and the flatness of a field cannot be maintained. As a consequence, a wide field of view cannot be realized on the object side. In contrast, a ratio of focal lengths higher than the upper limit value of conditional expression (3) makes the positive power too weak in second lens group G2, leading to a situation where even rotations of the correction collar for moving second lens group G2 cannot correct variations in spherical aberrations caused by variations in the thickness of a cover glass.

Conditional expression (4) defines a ratio of focal length of third lens group G3 to that of the microscope objective lens 1. When conditional expression (4) is satisfied, excellent correction of field curvature is realized in third lens group G3.

A ratio of focal lengths lower than the lower limit value of conditional expression (4) makes the negative power too intense in third lens group G3, causing a great comatic aberration. In contrast, a ratio of focal lengths higher than the upper limit of conditional expression (4) makes the negative power too weak in third lens group G3, making it difficult to correct the field curvature, and the flatness of the field cannot be maintained. As a consequence, a wide field of view cannot be realized on the object side.

Conditional expression (5) defines a ratio of the focal length of the cemented lens included in second lens group G2 to that of the microscope objective lens 1. When conditional expression (5) is satisfied, excellent correction is realized for variations in the spherical aberrations caused by variations in the thickness of cover glass CG in the cemented lens in second lens group G2.

A ratio of focal lengths lower than the lower limit of conditional expression (5) makes the positive power too intense in the cemented lens included in second lens group G2, lowering the beam height in the cemented lens and the subsequent lenses. This makes it difficult to correct the field curvature, and the flatness of the field cannot be maintained. Accordingly, a wide field of view cannot be realized on the object side. In contrast, a ratio of focal lengths higher than the upper limit value of conditional expression (5) makes the positive power too weak in the cemented lens, leading to a situation where even rotations of the correction collar for moving second lens group G2 cannot correct variations in spherical aberrations caused by variations in the thickness of a cover glass.

Conditional expression (6) defines a ratio of the maximum movement distance of second lens group G2 to the focal length of the microscope objective lens 1. When conditional expression (6) is satisfied, excellent correction is realized in second lens group G2 for variations in the spherical aberrations caused by variations in the thickness of cover glass CG.

A ratio lower than the lower limit value of conditional expression (6) prevents sufficient correction of spherical aberrations and off-axis comatic aberrations because the movement distance of second lens group G2 is too short. In contrast, a ratio higher than the upper limit value of conditional expression (6) narrows the space for the other lens groups because the movement distance of second lens group G2 is too long. Thereby, each lens constituting the other lens groups cannot have sufficient thickness, making it difficult to process such lenses, or preventing processing of such lenses.

Note that conditional expressions (3) through (6) may arbitrarily be combined with conditional expressions (1) and (2). It is also possible for each of the conditional expressions to use only one of the upper limit and the lower limit for defining the target.

Embodiment 1

Figure 2:
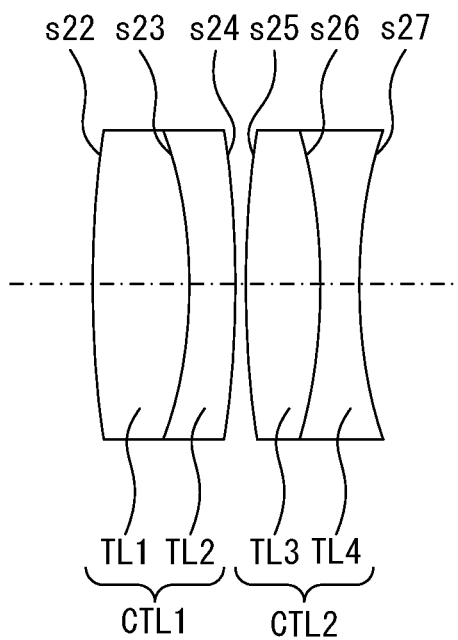
FIG. 2 is a sectional view of a tube lens according to the first embodiment of the present invention.

FIG. 1 is a sectional view of a microscope objective lens according to a present embodiment. FIG. 2 is a sectional view of a tube lens according to the present embodiment.

The microscope objective lens 1 exemplified in FIG. 1 is a dry objective lens having a correction collar, and includes first lens group G1 having a positive power, second lens group G2 having a positive power, third lens group G3 having a negative power, and fourth lens group G4 having a positive power, in order starting from the object side. Second lens group G2 moves in optical axis AX directions between first lens group G1 and third lens group G3 so as to correct variations in aberrations caused by the thickness of cover glass CG. In other words, second lens group G2 realizes a so-called correction collar function in the microscope objective lens 1.

More specifically, first lens group G1 includes a negative meniscus lens L1 having its concave surface on the object side, a positive meniscus lens L2 having its concave surface on the object side, and a positive meniscus lens L3 having its concave surface on the object side.

Second lens group G2 includes, in order starting from the object side, cemented lens CL1 of biconcave lens L4 and biconvex lens L5, and biconvex lens L6, and is configured to move the entire second lens group in the directions of optical axis AX accompanying rotations of the correction collar.

Also, third lens group G3 includes cemented lens CL2 of biconvex lens L7 and biconcave lens L8 in order starting from the object side.

Fourth lens group G4 includes cemented lens CL3 of negative meniscus lens L9 having its concave surface on the object side and positive meniscus lens L10 having its concave surface on the object side, and positive meniscus lens L11 having its concave surface on the object side.

Also, as shown in FIG. 1, cover glass CG is arranged on object plane OP, and light from object plane OP is incident on the microscope objective lens 1 through cover glass CG.

Tube lens 2 exemplified in FIG. 2 includes cemented lens CTL1 of lenses TL1 and TL2, and cemented lens CTL2 of lenses TL3 and TL4.

Hereinafter, explanations will be given for various pieces of data of the microscope objective lens 1 and the tube lens 2 according to the present embodiment.

Focal length F, object-side numerical aperture NA, and magnification β of the microscope objective lens 1, focal length f1 of first lens group G1, focal length f2 of second lens group G2, focal length f3 of third lens group G3, focal length f4 of fourth lens group G4, focal length f2CE of cemented lens CL1, and the maximum movement distance Δd of the second lens group G2 are expressed as below.

$F=8.97$ mm, NA=0.68, β=20, $f1=12.26$ mm, $f2=19.11$ mm, $f3=-19.32$ mm, $f4=121.94$ mm, $f2CE=90.75$ mm, $\Delta d=1.75$ mm Focal length Ft of the tube lens 2 is expressed as below.

$Ft=180$ mm

Lens data of the microscope objective lens 1 and tube lens 2 is as below.

| Microscope objective lens 1 | | | | |
|---|---|---|---|---|
| s | r | d | nd | vd |
| 1 (object plane) | ∞ | 1 | 1.59108 | 30.85 |
| 2 | ∞ | 1.735 | | |
| 3 | −4.2735 | 2.8622 | 1.7725 | 49.6 |
| 4 | −6.25 | 0.4094 | | |
| 5 | −21 | 2.6973 | 1.59522 | 67.74 |
| 6 | −8.4563 | 0.2937 | | |
| 7 | −351 | 2.4782 | 1.43875 | 94.93 |
| 8 | −13.5181 | da | | |
| 9 | −40.0993 | 1.6 | 1.63775 | 42.41 |
| 10 | 19.9343 | 5.2392 | 1.43875 | 94.93 |
| 11 | −13.1449 | 0.3 | | |
| 12 | 19.8541 | 4.2024 | 1.43875 | 94.93 |
| 13 | −26.1574 | db | | |
| 14 | 14.1673 | 4.7152 | 1.43875 | 94.93 |
| 15 | −16.1909 | 6.5 | 1.63775 | 42.41 |
| 16 | 7.2913 | 5.7446 | | |
| 17 | −5.7 | 1.3 | 1.61336 | 44.49 |
| 18 | −22.8346 | 2.2388 | 1.738 | 32.26 |
| 19 | −10.0801 | 0.35 | | |
| 20 | −16.7564 | 2.2924 | 1.497 | 81.54 |
| 21 | −9.7033 | | | |

| Tube lens 2 | | | | |
|---|---|---|---|---|
| s | r | d | nd | vd |
| 22 | 68.7541 | 7.7321 | 1.48749 | 70.2 |
| 23 | −37.5679 | 3.4742 | 1.8061 | 40.95 |
| 24 | −102.8477 | 0.6973 | | |
| 25 | 84.3099 | 6.0238 | 1.834 | 37.16 |
| 26 | −50.71 | 3.0298 | 1.6445 | 40.82 |
| 27 | 40.6619 | | | |

In the above data, s represents plane number, r represents radius of curvature (mm), d represents distance between the planes (mm), nd represents refractive index for d line, and vd represents Abbe number. Also, plane number s1 represents the object side plane (object plane OP) of cover glass CG, and plane number s3 represents the surface of the microscope objective lens 1 that is the closest to the object. Plane number s21 represents the surface of the microscope objective lens 1 that is the closest to the image plane. Plane number s22 represents the first surface (the surface closest to the object) of the tube lens 2, and plane number s27 represents the surface closest to the image of the tube lens 2. The interval between the microscope objective lens 1 and the tube lens 2 is 90 mm.

Further, distance d8 between plane number s8 and plane number s9, and distance d13 between plane number s13 and plane number s14 are variables da and db, and these vary depending upon a movement of second lens group G2 in the optical axis directions. Variables da and db are adjusted by rotating the correction collar in accordance with the thickness of cover glass CG. In FIG. 1, an example is shown in which da=1.4509 mm and db=1.688 mm.

The microscope objective lens 1 according to the present embodiment satisfies conditional expressions (1) through (6) as expressed by expressions (A1) through (A6) below. Expressions (A1) through (A6) correspond to conditional expressions (1) through (6).

$NA=0.68$ (A1)

$f1/F=1.37$ (A2)

$f2/F=2.13$ (A3)

$|f3/F|=2.15$ (A4)

$|f2CE/F|=10.12$ (A5)

$\Delta d/F=0.20$ (A6)

Figure 3:
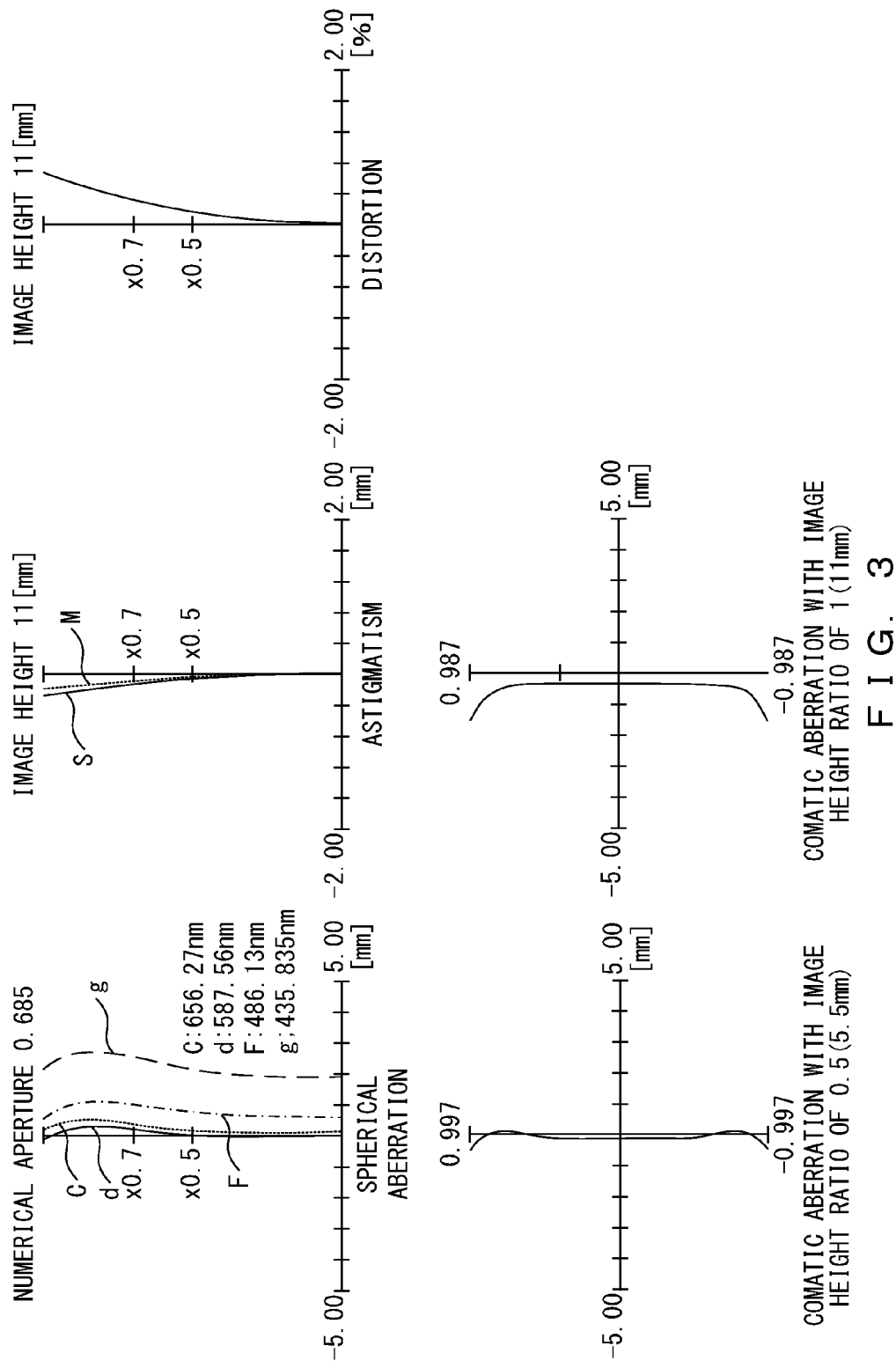
FIG. 3 is an aberration diagram in a case when the microscope objective lens exemplified in FIG. 1 and the tube lens exemplified in FIG. 2 are used in combination.

FIG. 3 is an aberration diagram showing the aberrations on the imaging plane on the image side in a case when the microscope objective lens exemplified in FIG. 1 and the tube lens exemplified in FIG. 2 are used in combination. A spherical aberration diagram, an astigmatism diagram, a distortion diagram, a comatic aberration diagram with an image height ratio of 0.5, and a comatic aberration diagram with an image height ratio of 1.0 are shown in FIG. 3. It is shown that excellent correction is realized for all of the types of aberrations. "M" in the astigmatism diagram represents a meridional component, and "S" represents a sagittal component.

Embodiment 2

Figure 4:
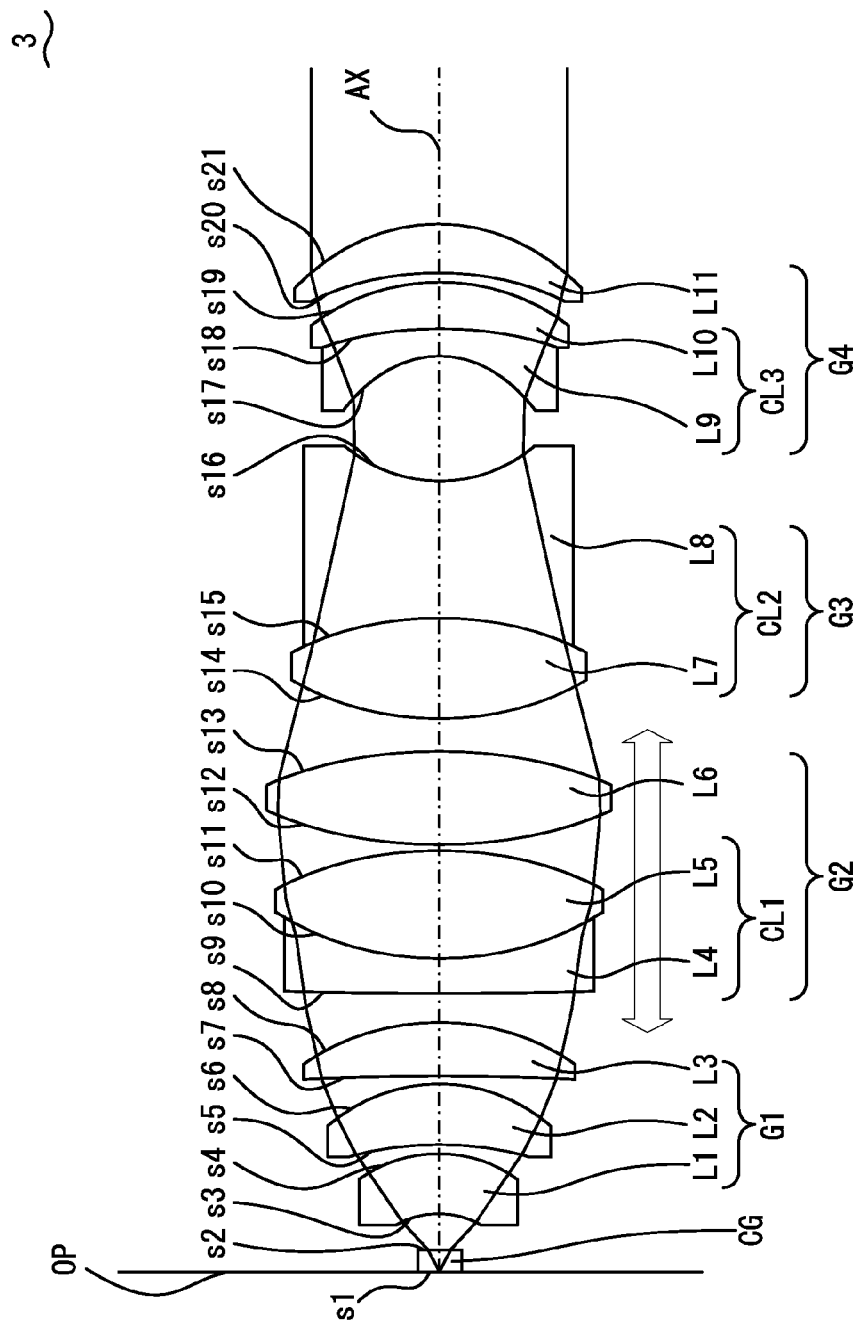
FIG. 4 is a sectional view of a microscope objective lens according to a second embodiment of the present invention.

FIG. 4 is a sectional view of a microscope objective lens according to the present embodiment. A microscope objective lens 3 exemplified in FIG. 4 is a is a dry objective lens having a correction collar, and includes a first lens group G1 having a positive power, a second lens group G2 having a positive power, a third lens group G3 having a negative power, and a fourth lens group G4 having a positive power, in order starting from the object side. Second lens group G2 moves in optical axis AX directions between first lens group G1 and third lens group G3 so as to correct variations in aberrations caused by the thickness of cover glass CG. In other words, second lens group G2 realizes a so-called correction collar function in the microscope objective lens 3.

More specifically, first lens group G1 includes, in order starting from the object side, a negative meniscus lens L1 having its concave surface on the object side, a positive meniscus lens L2 having its concave surface on the object side, and a positive meniscus lens L3 having its concave surface on the object side.

Second lens group G2 includes, in order starting from the object side, a cemented lens CL1 of negative meniscus lens L4 having its convex surface on the object side and a biconvex lens L5, and a biconvex lens L6, and is configured to move the entire second lens group in the directions of optical axis AX accompanying rotations of the correction collar.

Also, third lens group G3 includes a cemented lens CL2 of a biconvex lens L7 and a biconcave lens L8 in order starting from the object side.

Fourth lens group G4 includes, in order starting from the object side, a cemented lens CL3 of a negative meniscus lens L9 having its concave surface on the object side and a positive meniscus lens L10 having its concave surface on the object side, and a positive meniscus lens L11 having its concave surface on the object side.

As exemplified in FIG. 4, cover glass CG is arranged on object plane OP, and light from object plane OP is incident on the microscope objective lens 3 through cover glass CG. Also, similarly to embodiment 1, the tube lens 2 exemplified in FIG. 2 is arranged on the image side of the microscope objective lens 3 according to the present embodiment.

Various types of data of the microscope objective lens 3 according to the present embodiment are described below.

Focal length F, object-side numerical aperture NA, and magnification β of the microscope objective lens 1, focal length f1 of first lens group G1 and focal length f2 of second lens group G2, focal length f3 of third lens group G3, focal length f4 of fourth lens group G4, focal length f2CE of cemented lens CL1, and the maximum movement distance Δd of the second lens group G2 are expressed as below.

$F=9.01$ mm, NA=0.68, β=20, $f1=14.35$ mm, $f2=18.68$ mm, $f3=-17.88$ mm, $f4=105.78$ mm, $f2CE=70.83$ mm, $\Delta d=1.55$ mm Lens data of microscope objective lens 3 is as below.

Microscope objective lens 3

| s | r | d | nd | vd |
|---|---|---|---|---|
| 1 (object plane) | ∞ | 1 | 1.59108 | 30.85 |
| 2 | ∞ | 1.7487 | | |
| 3 | −4.2735 | 2.792 | 1.7725 | 49.6 |
| 4 | −7.4 | 0.39 | | |
| 5 | −17.6467 | 2.8901 | 1.59522 | 67.74 |
| 6 | −8 | 0.3 | | |
| 7 | −462 | 2.5315 | 1.43875 | 94.93 |
| 8 | −11.9558 | da | | |
| 9 | 182.432 | 1.6 | 1.63775 | 42.41 |
| 10 | 14.6492 | 5.0755 | 1.43875 | 94.93 |
| 11 | −18.7406 | 0.3 | | |
| 12 | 21.0527 | 4.3134 | 1.43875 | 94.93 |
| 13 | −22.461 | db | | |
| 14 | 14.1871 | 4.6023 | 1.43875 | 94.93 |
| 15 | −17.004 | 6.5 | 1.63775 | 42.41 |
| 16 | 6.8533 | 5.8954 | | |
| 17 | −5.7 | 1.3 | 1.61336 | 44.49 |
| 18 | −21.5416 | 2.1751 | 1.738 | 32.26 |
| 19 | −10.2762 | 0.33 | | |
| 20 | −17.8073 | 2.3906 | 1.497 | 81.54 |
| 21 | −9.5225 | | | |

In the above data, s represents plane number, r represents radius of curvature (mm), d represents distance between the planes (mm), nd represents a refractive index for a d line, and vd represents an Abbe number for a d line. Also, plane number s1 represents the object side plane (object plane OP) of cover glass CG, and plane number s3 represents the surface of the microscope objective lens 3 that is the closest to the object. Plane number s21 represents the surface of the microscope objective lens 3 closest to the image. The interval between the microscope objective lens 3 and the tube lens 2 is 90 mm.

Further, distance d8 between plane number s8 and plane number s9, and distance d13 between plane number s13 and plane number s14 are variables da and db, which vary depending upon a movement of second lens group G2 in the optical axis direction. Variables da and db are adjusted by rotating the correction collar in accordance with the thickness of cover glass CG. In FIG. 4, an example is shown in which da=1.3713 mm and db=1.599 mm.

The microscope objective lens 3 according to the present embodiment satisfies conditional expressions (1) through (6) as expressed by expressions (B1) through (B6) below. Expressions (B1) through (B6) correspond to conditional expressions (1) through (6).

$$NA=0.68 \quad (B1)$$

$$f1/F=1.59 \quad (B2)$$

$$f2/F=2.07 \quad (B3)$$

$$|f3/F|=1.98 \quad (B4)$$

$$|f2CE/F|=7.86 \quad (B5)$$

$$\Delta d/F=0.17 \quad (B6)$$

Figure 5:
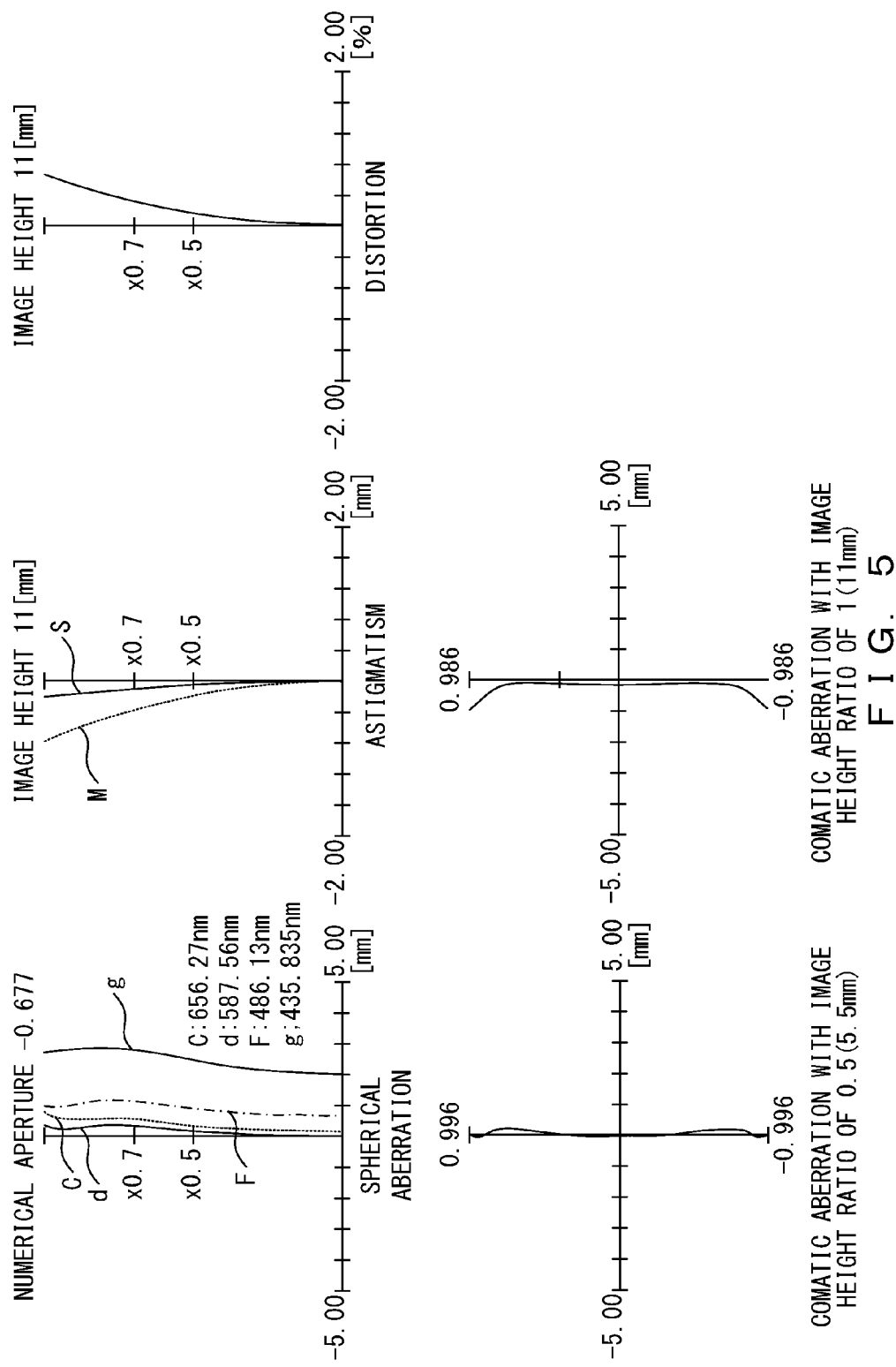
FIG. 5 is an aberration diagram in a case when the microscope objective lens exemplified in FIG. 4 and the tube lens exemplified in FIG. 2 are used in combination.

FIG. 5 is an aberration diagram showing the aberrations on the imaging plane on the image side in a case when the microscope objective lens exemplified in FIG. 4 and the tube lens exemplified in FIG. 2 are used in combination. A spherical aberration diagram, an astigmatism diagram, a distortion diagram, a comatic aberration diagram with an image height ratio of 0.5, and a comatic aberration diagram with an image height ratio of 1.0 are shown in FIG. 5. It is shown that excellent correction is realized for all of the types of aberrations. "M" in the astigmatism diagram represents a meridional component, and "S" represents a sagittal component.

What is claimed is:
1. A microscope objective lens, comprising in order starting from an object side:
   a first lens group having positive power;
   a second lens group having positive power;

a third lens group having negative power; and
a fourth lens group having positive power, wherein:
the second lens group is configured to move in an optical axis direction between the first lens group and the third lens group so as to correct a variation in an aberration caused by a thickness of a cover glass; and
the following conditions are satisfied:

$0.65 < NA < 1$; and $1 \leq f1/F < 2$, where:

NA is a numerical aperture of the microscope objective lens, F is a focal length of the microscope objective lens, and f1 is a focal length of the first lens group.

2. The microscope objective lens according to claim 1, wherein:
the following conditions are satisfied:

$1 \leq f2/F < 3$; and $1 < |f3/F| < 2.4$, where:

f2 is a focal length of the second lens group, and f3 is a focal length of the third lens group.

3. The microscope objective lens according to claim 2, wherein:

the first lens group includes three single lenses;
the second lens group includes, in order starting from an object side, a cemented lens having a negative lens and a positive lens, and a biconvex lens;
the third lens group includes a cemented lens that has a meniscus shape having a convex surface on an object side, and that has a positive lens and a negative lens;
the fourth lens group includes a cemented lens located at a position closest to an object side;
at least two of the single lenses on an object side are meniscus lenses each having a concave surface on an object side; and
the following condition is satisfied:

$5 < |f2CE/F| < 15$, where:

f2CE is a focal length of the cemented lens included in the second lens group.

4. A microscope objective lens according to claim 3, wherein:
the following condition is satisfied:

$0.1 < \Delta d/F < 0.3$, where:

$\Delta d$ is a maximum movement distance of the second lens group in the optical axis direction.

* * * * *